United States Patent [19]

Negishi

[11] Patent Number: 4,761,661

[45] Date of Patent: Aug. 2, 1988

[54] EMERGENCY RESETTING CIRCUIT FOR A SEMICONDUCTOR LASER OF A LASER BEAM PRINTER

[75] Inventor: Kiyoshi Negishi, Saitama, Japan

[73] Assignees: Asahi Kogaku Kogyo Kabushiki, Tokyo; Matsushita Electric Industrial Co., Ltd., Osaka, both of Japan

[21] Appl. No.: 467

[22] Filed: Jan. 5, 1987

[30] Foreign Application Priority Data

Jan. 13, 1986 [JP] Japan ............................... 61-3890[U]

[51] Int. Cl.⁴ ............................................... G01D 9/42
[52] U.S. Cl. ...................................... 346/108; 346/160
[58] Field of Search ................. 346/107 R, 108, 76 L, 346/160; 358/296

[56] References Cited

U.S. PATENT DOCUMENTS 4,649,403 3/1987 Miura ................................... 346/160

OTHER PUBLICATIONS

Computers & Electronics, "Laserjet Printer", by Josef Bernard, Jul. 1984.

Primary Examiner—H. Broome
Assistant Examiner—Mark Reinhart
Attorney, Agent, or Firm—Sandler & Greenblum

[57] ABSTRACT

An emergency reset circuit is provided for interrupting the light output of a modulatable laser of a laser beam printer (LBP) that produces a hard copy of image information by copy-processing a photosensitive surface scanned by the laser when it is supplied with a preset driving current and produces light at a preset level. The laser is operated by a control system that produces a preselected driver voltage that is applied to a laser driver circuit that supplies driving current to the laser. The driver circuit is responsive to the preselected driver voltage for producing said preselected laser driving current whereby the laser to operate at its preset level. The emergency reset circuit includes a latch circuit responsive to an emergency reset signal for zeroing the drive voltage, and an offset circuit for supplying a preselected offset voltage to the laser driver circuit when the driver voltage is zeroed. The offset voltage is of such value as to cause the driving current produced by the laser driver to have a level below the threshold at which the laser emits light.

16 Claims, 2 Drawing Sheets

EMERGENCY RESETTING CIRCUIT FOR A SEMICONDUCTOR LASER OF A LASER BEAM PRINTER

TECHNICAL FIELD

This invention relates to an emergency resetting circuit for a semiconductor laser of a laser beam printer.

BACKGROUND ART

In a laser beam printer (LBP), an electrostatic latent image is formed on the photosensitive surface of a rotating drum by scanning the surface with a laser beam modulated in accordance with image information such as text, etc. A hard copy of the image information is obtained from the photosensitive surface by a copy-processing technique that includes development of a sensible image, and its transcription and fixation on a paper sheet. A typical laser beam printer is illustrated in the July 1984 issue of *Computers and Electronics* in an article entitled "HP's New Laserjet Printer" by Josef Bernard. This article is hereby incorporated by reference.

In the event of a malfunction in a laser printer, such as, for example, a paper jam, this condition is sensed and the mechanical drive is interrupted to allow the malfunction to be corrected. The resultant interruption often occurs during the scanning process while the laser beam is actually writing on the photosensitive surface. Once an interruption occurs, drum rotation terminates with the result that the laser beam impinges upon a fixed region on the photosensitive surface. To prevent local deterioration of the surface, the laser beam must be extinguished upon detection of a malfunction.

Conventionally, the laser is extinguished by shutting down its power supply in response to detection of a malfunction. The problem with this approach is the time required to re-initialize the laser in order to raise its light output to a preselected value after the cause of the malfunction is corrected and the system is re-started.

It is therefore an object of the present invention to provide an emergency resetting circuit for a semiconductor laser driving apparatus which does not suffer from the deficiencies described above.

BRIEF DESCRIPTION OF THE INVENTION

The present inventio provides an emergency reset circuit for interrupting the light output of a modulatable laser of a laser beam printer (LBP) that produces a hard copy of image information by copy-processing a photosensitive surface scanned by the laser when it is supplied with a preset driving current and produces light at a preset level. The circuit for operating the laser includes a control system that produces a preselected driver voltage that is applied to a laser driver circuit that supplies driving current to the laser. The driver circuit is responsive to said preselected driver voltage for producing said preset driving current whereby the laser emits light at its preselected level.

The emergency reset circuit according to the present invention comprises a latch circuit for zeroing the driver voltage in response to an emergency reset signal produced upon detection of malfunction in the operation of the laser beam printer. It also includes an offset circuit for applying a preselected offset voltage to said laser driver circuit when the driver voltage is zero, said offset voltage being of such value as to cause the driving current produced by said laser driver to have a level that is below the threshold that causes said laser to emit light.

In normal operation, the preselected driver voltage is applied to the laser driver circuit which responds by supplying said preset driving current to the laser causing the latter to emit a preset level of light. Scanning of the photosensitive surface takes place as the laser beam is modulated in accordance with image information. When a malfunction, such as a paper jam, is detected, the voltage applied to the input terminal of the laser driver is switched to the preselected offset voltage produced by the offset circuit. As a consequence, the driving current produced by the laser driver is reduced to a level below the threshold that causes the laser to emit light, and light emission thus terminates. Immediately upon correction of the malfunction that resulted in the generation of the reset signal, the offset circuit is effective to switch the voltage applied to the laser driving circuit back to the preselected driver voltage thus immediately returning the light output of the laser to its preset level allowing immediate resumption of scanning by the laser.

BRIEF DESCRIPTION OF THE DRAWINGS

An embodiment of the present invention is shown in the accompanying drawings wherein.

DETAILED DESCRIPTION

Figure 1:
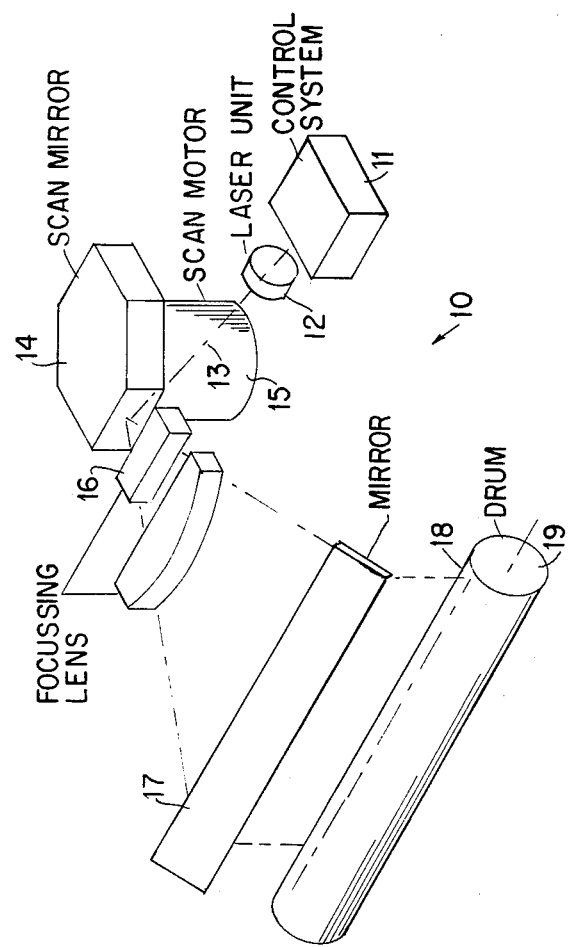
FIG. 1 is a schematic representation of a conventional laser beam printer.

Referring now to FIG. 1, reference numeral 10 designates, in schematic form, a laser beam printer (LBP) with which the present invention is used. LBP 10 comprises control sytem 11 that, under normal circumstances, supplies a preselected driving current to laser unit 12 thereby producing beam of light 13 having a preset level. Beam 13 is reflected from a multi-faceted scan mirror 14 rotatably driven by motor 15. As a consequence, beam 13, after passing through focusing lenses 16 linearly impinges upon mirror 17 which directs a scanning beam onto photo-sensitive surface 18 of drum 19 that rotates in synchronism with scan motor 15. Control system 11 supplies a modulation to the current applied to laser 12 in accordance with image information to be reproduced. A paper copy of the image information is obtained by developing the electrostatic latent image produced on surface 18 by the scanning laser beam.

If a paper jam occurs during the copy-processing of the latent image onto the hard copy, rotation of drum 19 is terminated. If laser 12 is not immediately extinguished, the beam reflected by mirror 17 would damage photo-senstive surface 18. The apparatus of the present invention show in FIG. 2 is provided for the purpose of rapidly extinguishing the light output of the laser in a way that permits immediate restoration of the light output to its present level upon the clearing of the jam.

Figure 2:
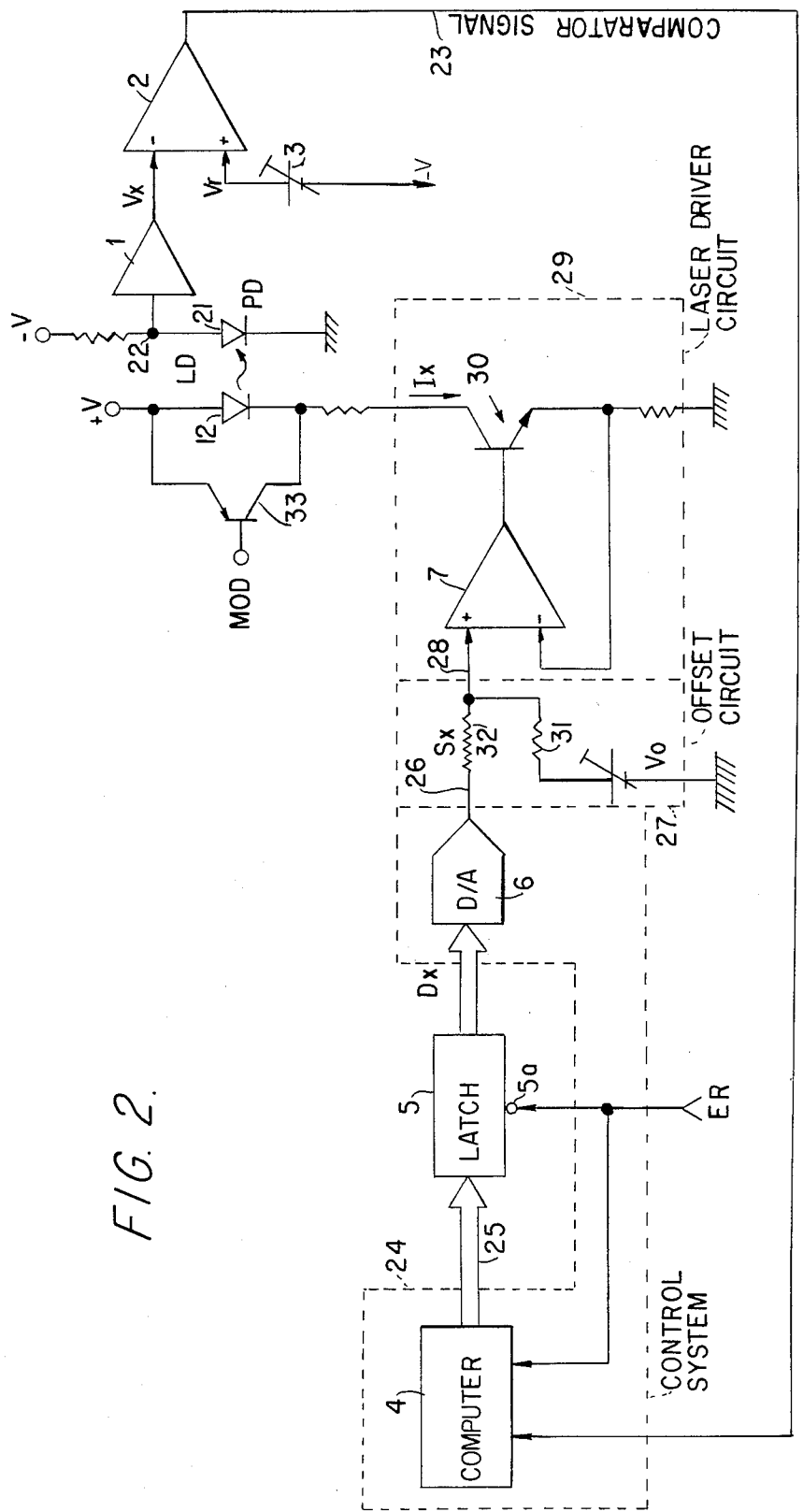
FIG. 2 is a block diagram of an emergency reset circuit according to the present invention for incorporation into a laser beam printer of the type shown in FIG. 1.

As shown in FIG. 2, some of the light produced by laser 12 is incident on photodiode 21 whose impedance is functionally related to the intensity of light incident thereon. As a consequence, the voltage at node 22 is directly related to the light output of laser 12. This voltage is amplified by amplifier 1 and supplied as voltage $V_x$ to one input terminal of comparator circuit 2. Reference voltage $V_r$ derived from power supply 3 is applied to the other terminal of comparator 2. Thus, comparator 2 produces a comparator signal in lead 23 that is functionally related to the $V_r-V_x$, which is representative of the difference between the actual intensity of light produced by laser 12 and a preselected reference intensity as determined by reference voltage 3.

Control system 24 receives the comparator signal and operates on it to produce a signal which controls the level of current supplied to laser 12. Control system 24 includes digital means in the form of computer 4 responsive to the comparator signal for producing digital data that appears in output data bus 25. These data normally pass through latch 5 and appear as digital data $D_x$ which are applied to the input of digital-to-analog converter 6 of control system 24. The voltage $S_x$ appearing at output terminal 26 of the converter has a level directly related to digital data $D_x$ which is directly related to the comparator signal appearing in lead 23. Output voltage $S_x$ is referenced to below as the "driver voltage" produced by control system 24. This driver voltage is applied through offset circuit 27 to input terminal 28 of buffer amplifier 7 of laser driving circuit 29. The output of buffer amplifier 7 supplies base current to transistor 30 whose collector is serially connected to laser 12. Offset circuit 27 is effective to AND voltage $S_x$ appearing at output terminal 26 of convertor 6 with preselected offset voltage $V_O$, and to apply the sum to input terminal 28 of laser driver circuit 29. Offset voltage a source $V_O$ is connected to input terminal 28 through resistor 31, which constitutes a first channel of the offset circuit; and voltage $S_x$ at output terminal 26 of convertor 6 is connected to input terminal 28 through resistor 32, which constitutes a second channel of the offset circuit. Thus, the voltage appearing at input terminal 28 of buffer 2 is the sum of the voltage $S_x$ appearing at the output of convertor 6 and offset voltage $V_O$.

When voltage $V_x$ is less than voltage $V_r$, which is to say, when the light produced by laser 12 is less than a preset level, comparator 2 produces a comparator signal which causes computer 4 to produce digital data $D_x$ such that the value of driver voltage $S_x$ is increased thus increasing current $I_x$ produced by transistor 30. When voltage $V_x$ is substantially equal to voltage $V_r$, which is to say, that the intensity of light produced by laser 12 has reached a preset level, and current $I_x$ has a present value, the comparator signal supplied to computer 4 causes the latter to produce a unique digital data signal such that driver voltage $S_x$ has a preselected value. Such preselected value causes collector current $I_x$ of transistor 30 of laser driving circuit 29 to have a preset value which causes laser 12 to produce light at a preset level.

The apparatus and its function described thus far, with the circuit shown in FIG. 2, is more fully described in compending patent appication Ser. No. 924,879 filed Oct. 30, 1986, which is assigned to one of the assignees of the present application. Comparator circuit 2, in cooperation with computer 4, constitutes an automatic power control (APC) circuit which is effective on powering-up a laser beam printer initialize laser 12 by quickly bringing laser 12 to its present level of light output. That is to say, the APC serves the purpose of rapidly bringing the light output of laser 12 to its present level consistent with proper operation of the laser beam printer. Once this level is established, the scanning operation of the laser beam can take place. The present invention provides apparatus for insuring that this level of the laser output will immediately be restored upon correction of a malfunction in the mechanical system associated with the laser beam printer.

Under normal operating conditions, laser 12 produces light at its preset level. The control system of the laser printer effects a scanning operation of the laser while the latter produces light at its preset level and is modulated in accordance with an image information modulation signal applied to modulator transistor 33. If a malfunction occurs, it is sensed and produces an emergency reset (ER) signal which is applied to computer 4 and to terminal 5a of latch circuit 5. Computer 4 terminates further mechanical operation of the laser beam printer; and, simultaneously, latch 5 is effective to zero the unique digital data signal being supplied by computer 4 to convertor 6. As a consequence of the zeroing of the digital data, driver voltage $S_x$ produced by convertor 6 is also zeroed so that the voltage applied to input terminal 28 of buffer 2 is switched from the preselected driver voltage to preselected offset voltage $V_o$. The magnitude of this offset voltage is mush smaller than the magnitude of the preselected driver voltage, and is such as to cause driving current $I_x$ produced by the laser driver circuit to have a level much lower than its present level, and in fact, a level that is below the threshold that causes laser 12 to emit light. Consequently, an emergency reset signal immediately extinguishes laser 12. Immediately upon correction of the malfunction that resulted in the generation of the emergency reset signal, latch 5 is reset allowing the unique digital data signal produced by computer 4 to be applied to converter 6. Thus, the preselected driver voltage once more appears at the output 26 of convertor 6, and offset circuit 27 is responsive to this condition for raising the voltage at input terminal 28 to a level where current at a preset level again flows through laser 12 thereby causing the laser, once more, to emit light at its present level. Note that the apparatus shown in FIG. 2 is capable of immediately returning the laser to its normal operation because its power supply is not interrupted.

The interposition of a latch circuit between computer 4, which generates digital data, and digital-to-analog converter 6 permits compatibility to be established even if the number of bits of the output port of computer 4 does not coinsides with the number of bits of the input terminal of converter 6. Assume, for example, that an 8-bit multichip microcomputer is used, and an I/O device externally of the CPU is used which can afford, in most cases, 8-bit parallel simultaneous output. However, in case of a one-chip microcomputer, an I/O device is, in a sense, built into the CPU; and hence a 8-bit parallel simultaneous output may not always be impossible. In such a case, because 8 I/O lines must necessarily be used to transmit a signal to a 8-bit digital-to-analog convertor, the signal must be transmitted, one after another, over the 8 I/O lines. Accordingly, difficult condition will arise when the number of bits must be changed. This may sometimes cause the destruction of a semiconductor laser diode becaue an excessive current may be applied to the semiconductor laser diode. However, this problem is avoided if a latch switch is provided externally. Thus, owing to the provision of latch circuit 5, any I/O device, in addition to an 8-bit I/O device, can be used. For example, a pair of 4-bit I/O devices may be used in combination.

Those skilled in the art will appreciate that the foregoing description of the preferred embodiment of the present invention is illustrative only, and that various changes and modifications in the invention as defined by the appended claims may be made without departing from the spirit and scope of the invention.

I claim:

1. An emergency reset circuit adapted for use with a laser beam printer which includes a modulatable laser, a laser driver circuit, and a control system, said reset circuit comprising means for interrupting the light output of said modulatable laser, said laser beam printer comprising means for producing a hard copy of image information by copy-processing a photosensitive surface scanned by the laser when said laser is supplied with a preset driving current and produces light at a preset level, said laser being operated by said control system, said control system comprising means for producing a preselected driver voltage that is applied to said laser driver circuit that supplies driving current to said laser, said laser driver circuit being responsive to said preselected driver voltage so as to comprise means for producing said preset driving current, whereby said laser emits light at said preset level, said emergency reset circuit comprising a latch circuit comprising means for zeroing the driver voltage produced by said control system in response to receipt of an emergency reset signal produced by means for detecting a malfunction in the operation of said laser beam printer when a malfunction occurs, and an offset circuit comprising means for applying a preselected offset voltage to said laser driver circuit when said driver voltage is zeroed, said offset voltage having a value sufficient to cause the driving current produced by said laser driver circuit to be at a level that is below the threshold level at which said laser emits light.

2. An emergency reset circuit according to claim 1 wherein said offset circuit is responsive to zeroing the driver voltage for supplying said preselected offset voltage to said laser driver circuit.

3. An emergency reset circuit according to claim 1 wherein said control system includes digital means for producing digital data that are converted by a digital to analog converter to said driver voltage, said emergency circuit being interposed between the digital means and the digital to analog converter.

4. An emergency reset circuit according to claim 3 wherein said laser driver has an input terminal, and the offset circuit includes a first channel that connects the output of the digital to analog converter to the input terminal of said laser driver, and a second channel that connects the input of said laser driver to a power supply having a predetermined value.

5. An emergency reset circuit according to claim 4 including a resistance in each of the first and second channels.

6. An emergency reset circuit according to claim 4 wherein said power supply is adjustable.

7. An emergency reset circuit according to claim 4 wherein said emergency reset circuit is responsive to the termination of a malfunction to effect return of the driver voltage to its preset value whereby the laser again emits light at its preset value.

8. An emergency reset circuit in accordance with claim 1, wherein said reset circuit is used in combination with said laser beam printer.

9. The invention of claim 8 wherein said latch circuit is positioned between said digital means and said digital-to-analog converter.

10. The invention of claim 9 wherein each connection means is constituted by a resistance.

11. Apparatus for controlling the output of a laser comprising:
    (a) a laser driver system for supplying driving current to said laser, the level of said current being functionally related to the level of an input signal applied to an input terminal of said laser driver system;
    (b) a control system for producing a preselected driver voltage at the output terminal of said control circuit;
    (c) an offset circuit for producing a preselected offset voltage when said driver voltage is zero; and
    (d) latch means for effecting the application of said preselected driver voltage to said input terminal until a reset signal occurs, and thereafter effecting the application of said offset voltage to said input terminal.

12. Apparatus according to claim 11 wherein said offset voltage source is adjustable.

13. Apparatus according to claim 11 wherein said control system includes digital means for producing digital data indicative of a desired level of light output from said laser, and a digital to analog converter whose output terminal constitutes the output terminal of said control system, said digital to analog converter being responsive to said digital data for producing said preselected driver voltage at said output terminal, and said latch means includes a latch circuit interposed between said digital means and said digital to analog converter for latching the digital data applied to said digital to analog converter at zero in response to said reset signal.

14. In a laser beam printer (LBP) that produces a hard copy of image information by copy-processing a photosensitive surface scanned by a laser when it operates at a preset level and is modulated said image information, an automatic power circuit for establishing a preset level of the laser including a comparator circuit producing a comparator signal functionally related to the difference between the actual intensity of light produced by the laser and a preselected reference intensity, and a control system having digital means responsive to said comparator signal for producing digital data which defines a unique signal indicative of operation of said laser at said preset level when the intensity of light produced by the laser is substantially equal to said predetermined reference intensity, a digital-to-analog convertor having an output terminal and responsive to said unique data signal for producing a preselected driver voltage at said output terminal, a laser driver circuit having an input terminal for producing a preselected current in response to the application of said preselected driver voltage to said input terminal, the improvement comprising:
    an emergency reset circuit responsive to an emergency reset signal produced by a malfunction in the operation of the LBP for reducing the output of said laser, said reset circuit being constructed and arranged to switch the voltage at the input terminal of said laser driver circuit to an offset voltage lower than said preselected driver voltage.

15. Apparatus for controlling the output of a laser comprising:

(a) a laser driver system for supplying driving current to said laser, the level of said driving current being functionally related to the level of an input signal applied to an input terminal of said laser driver system;

(b) a control system for producing a preselected driver voltage at the output terminal of said control circuit;

(c) an offset circuit which includes an offset voltage source, a first resistor connecting said offset voltage source to said input terminal, and a second resistor connecting said output terminal of said control circuit to said input terminal, said offset circuit comprising means for producing a preselected offset voltage when said driver voltage is zero; and (d) latch means for effecting the application of said preselected driver voltage to said input terminal until a reset signal occurs, and thereafter effecting the application of said offset voltage to said input terminal.

16. A laser beam printer (LBP) system that produces a hard copy of information by copy-processing a photosensitive surface scanned by a laser when it operates at a preset level and is modulated by said image information, an automatic power circuit for establishing a preset level of said laser including a comparator circuit which produces a comparator signal functionally related to the difference between the actual intensity of light produced by said laser and a preselected reference intensity, and a control system having digital means responsive to said comparator signal for producing digital data which defines a unique signal indicative of operation of said laser at said preset level when the intensity of light produced by the laser is substantially equal to said preselected reference intensity, a digital-to-analog-converter having an output terminal and being responsive to said unique data signal for producing a preselected driver voltage at said output terminal, a laser driver circuit having an input terminal for producing a preselected current in response to the application of said preselected driver voltage to said input terminal, and an emergency reset circuit which is responsive to an emergency reset signal produced by a malfunction in the operation of said laser beam printer for reducing the output of said laser, said emergency reset circuit being constructed and arranged to switch the voltage at the input terminal of said laser driver circuit to an offset voltage lower than said preselected driver voltage, wherein said emergency reset circuit comprises a latch circuit responsive to a reset signal for zeroing driver voltage, and an offset circuit interposed between said digital-to-analog converter and the input to said laser driver circuit, said offset circuit including an offset voltage source connected to said input terminal by first connection means, and second connection means connecting said output terminal to said input terminal.

* * * * *

UNITED STATES PATENT AND TRADEMARK OFFICE
CERTIFICATE OF CORRECTION

PATENT NO. : 4,761,661

DATED : August 2, 1988

INVENTOR(S) : Kiyoshi NEGISHI

It is certified that error appears in the above-identified patent and that said Letters Patent is hereby corrected as shown below:

In the Abstract, at line 15, change "drive" to ---driven---.

At column 1, line 47, change "inventio" to ---invention---.

At column 2, line 59, change "show" to ---shown---.

At column 3, line 58, change "compending" to ---co-pending---.

At column 3, lines 66-67, change "presenc" to ---preset---.

At column 4, line 23, change "musn" to ---much---.

At column 4, lines 26-27, change "present" to ---preset---.

At column 4, line 40, change "present" to ---preset---.

At column 4, line 48, change "coinsides" to ---coincide---.

At column 4, line 54, change "a" to ---an--- (second occurrence).

At column 4, line 57, change "a" to ---an--- (second occurrence).

UNITED STATES PATENT AND TRADEMARK OFFICE
CERTIFICATE OF CORRECTION

PATENT NO. : 4,761,661

DATED : August 2, 1988

INVENTOR(S) : Kiyoshi NEGISHI

It is certified that error appears in the above-identified patent and that said Letters Patent is hereby corrected as shown below:

At column 4, line 60, change "condition" to ---conditions--.

Signed and Sealed this

Twenty-fourth Day of July, 1990

Attest:

HARRY F. MANBECK, JR.

*Attesting Officer*  *Commissioner of Patents and Trademarks*